US011353367B2

(12) United States Patent
Godfrey (10) Patent No.: US 11,353,367 B2
(45) Date of Patent: Jun. 7, 2022

(54) FIBRE OPTIC TEMPERATURE MEASUREMENT

(71) Applicant: OPTASENSE HOLDINGS LIMITED, Farnborough (GB)

(72) Inventor: Alastair Godfrey, Farnborough (GB)

(73) Assignee: OPTASENSE HOLDINGS LIMITED

( * ) Notice: Subject to any disclaimer, the term of this patent is extended or adjusted under 35 U.S.C. 154(b) by 179 days.

(21) Appl. No.: 16/064,201

(22) PCT Filed: Dec. 19, 2016

(86) PCT No.: PCT/GB2016/053988
§ 371 (c)(1),
(2) Date: Jun. 20, 2018

(87) PCT Pub. No.: WO2017/109469
PCT Pub. Date: Jun. 29, 2017

(65) Prior Publication Data
US 2019/0003903 A1    Jan. 3, 2019

(30) Foreign Application Priority Data

Dec. 23, 2015 (GB) ................................. 1522715

(51) Int. Cl.
*G01K 11/32* (2021.01)
*G01D 5/353* (2006.01)

(52) U.S. Cl.
CPC ......... *G01K 11/32* (2013.01); *G01D 5/35361* (2013.01)

(58) Field of Classification Search
CPC .......... G01J 5/0821; G01J 5/08; G01J 3/0218; G01J 3/44; G01J 3/4406; G01K 11/32;
(Continued)

(56) References Cited

U.S. PATENT DOCUMENTS 6,945,692 B2 *  9/2005  Dammann ............. B64D 45/00
                                                      250/227.14
9,151,924 B2 * 10/2015  Balasubramaniam ......................
                                                      G01K 11/3206
(Continued)

FOREIGN PATENT DOCUMENTS

DE        4408836        5/1995
ES        2601235 T3 *   2/2017    ........... H04B 10/806
(Continued)

*Primary Examiner* — Gail Kaplan Verbitsky
(74) *Attorney, Agent, or Firm* — McDonnell Boehnen Hulbert & Berghoff LLP (57) ABSTRACT

A temperature sensor for measuring temperature is described. The sensor comprises a fibre optic cable (104) comprising optical fibre (102) and an interrogator unit (106) configured to interrogate the optical fibre with electromagnetic radiation, detect any radiation that is Rayleigh backscattered within the optical fibre and determine a measurement signal indicative of temperature changes for at least one longitudinal sensing portion of the optical fibre. A controllable thermal element, which may be a heating element, such as an electrically conducting element (108), is arranged along the length of the fibre optic cable (104) and in thermal communication with the fibre optic cable (104). A controller (110) is configured to generate a thermal variation in the controllable thermal element, e.g. by generating a time varying electric current in the electrically conducting element (108). An analyser (112) is configured to analyse the measurement signal, extract a thermal response signal corresponding to the thermal variation and compare the thermal response to a predetermined characteristic to determine the temperature of the fibre optic cable at said longitudinal sensing portion.

20 Claims, 3 Drawing Sheets

(58) Field of Classification Search
CPC ............ G01K 1/024; G01K 3/06; G01K 3/00;
G01K 11/3206; G01K 3/14; G01K 11/00;
G01K 11/324; G01K 1/00; G01N 21/00;
G01N 2291/02881; G01N 23/203; G01N
21/17; G01N 2201/088; G01F 1/661;
G01F 1/696; G01F 1/704; G01D 5/35361
USPC ......... 374/110, 112.121, 130, 131, 137, 161,
374/46; 356/43, 44
See application file for complete search history.

(56) References Cited

U.S. PATENT DOCUMENTS

| | | | |
|---|---|---|---|
| 10,247,584 B2 * | 4/2019 | Crickmore | G01K 11/32 |
| 10,465,501 B2 * | 11/2019 | Friehauf | G01K 11/32 |
| 2005/0089081 A1 * | 4/2005 | Dammann | G08B 17/06 |
| | | | 374/161 |
| 2012/0250722 A1 * | 10/2012 | Barfoot | G08B 17/06 |
| | | | 374/1 |
| 2014/0290357 A1 | 10/2014 | Zhang et al. | |
| 2015/0049981 A1 * | 2/2015 | Balasubramaniam | ........................ |
| | | | G01D 5/35383 |
| | | | 385/13 |
| 2015/0268078 A1 | 9/2015 | Zhang et al. | |
| 2016/0169711 A1 * | 6/2016 | Blakley | G01K 1/08 |
| | | | 374/137 |
| 2017/0045410 A1 * | 2/2017 | Crickmore | G01M 3/047 |
| 2017/0336269 A1 * | 11/2017 | Wilson | G01K 11/32 |
| 2017/0350735 A1 * | 12/2017 | Cheng | G01D 5/35329 |
| 2018/0045768 A1 * | 2/2018 | Godfrey | G01R 31/11 |
| 2018/0106777 A1 * | 4/2018 | Duan | E21B 47/005 |
| 2018/0143085 A1 * | 5/2018 | Uno | G01K 11/32 |
| 2019/0310077 A1 * | 10/2019 | Kishida | G01D 5/35374 |
| 2021/0123817 A1 * | 4/2021 | Champavere | G01D 5/35361 |
| 2021/0262868 A1 * | 8/2021 | Bulot | C03B 37/02718 |

FOREIGN PATENT DOCUMENTS

| | | | | |
|---|---|---|---|---|
| WO | WO-2014207477 A1 * | 12/2014 | ......... | G01D 5/35361 |
| WO | WO 2015/153549 | 10/2015 | | |

* cited by examiner

FIBRE OPTIC TEMPERATURE MEASUREMENT

FIELD OF THE INVENTION

This application relates to methods and apparatus for fibre optic temperature sensing, and in particular to determining temperature using a distributed fibre optic sensor based on Rayleigh scattering.

BACKGROUND OF THE INVENTION

Fibre optic sensing is a known technique where an optical fibre, deployed in an area of interest as a sensing fibre, is interrogated with interrogating radiation and radiation which emerges from the fibre is detected and analysed to determine properties of the environment in which the sensing optical fibre is situated. Some fibre optic sensors rely on deliberately introduced features within the fibre, e.g. fibre Bragg gratings or the like, to induce reflection from a point in the fibre. In a distributed fibre optic sensor however the radiation which is backscattered from inherent scattering sites within the fibre is detected. The sensing function is thus distributed throughout the fibre and the spatial resolution and arrangement of the various sensing portions depends on the characteristics of the interrogating radiation and the processing applied.

Fibre optic sensors for distributed temperature sensing (DTS) are known which rely on detecting optical radiation which has been subjected to Brillouin and/or Raman scattering. By looking at the characteristics of the Brillouin frequency shift and/or the amplitudes of the Stokes/anti Stokes components the absolute temperature of a given sensing portion of fibre can be determined. DTS is a useful technique with a range of applications but most DTS systems require relatively long time averages to provide the desired accuracy, meaning such DTS systems are less useful for detecting relatively rapid changes in temperature.

Fibre optic sensors based on analysing Rayleigh backscatter to detect dynamic stimuli acting on the sensing fibre are also known. Such sensing has typically been applied to detect relatively fast acting dynamic strains, e.g. at a frequency of the order of a few tens of Hz or higher, and thus is sometimes referred to as distributed acoustic sensing (DAS).

With a Rayleigh based distributed fibre optic sensor coherent optical radiation, i.e. light, is launched into a first end of the sensing optical fibre. This interrogating radiation will be subject to Raleigh scattering from the various inherent scattering sites within an optical fibre. The backscatter received back at the first end of the fibre at any given time will be the combination of the scattered radiation from various scattering sites within a section of the fibre illuminated by the interrogating radiation. As the interrogating radiation is coherent, the radiation scattered from the various scattering sites will interfere to produce an overall backscatter signal which depends on the distribution of the scattering sites. The interrogating radiation may be arranged such that backscatter from only part of the sensing fibre reaches the first end of the fibre at any time where it is detected. By processing the detected backscatter in time bins the backscatter signal from various longitudinal sensing portions of the optical fibre can be identified. As the distribution of the inherent scattering sites throughout the optical fibre is effectively random the variation in backscatter signal from one longitudinal sensing portion to the next may exhibit a random component. However, in the absence of any environmental stimuli acting on the longitudinal sensing portion, the backscatter signal from that sensing portion will be the same from one interrogation to the next.

A dynamic strain acting on a sensing portion of the fibre, e.g. a mechanical vibration such as caused by an incident acoustic wave, will alter the distribution of scattering sites in that sensing portion, which will alter the way in which the scattering interferes. This can result in a detectable change in the properties of the Raleigh backscattered light. Analysing such changes allows vibrations/acoustic stimuli acting on sensing portions of the optical fibre to be detected.

As mentioned, typically DAS sensors have been used to detect relatively fast changing dynamic strain stimuli acting on the sensing fibre, e.g. to detect acoustic stimuli with frequencies of the order of tens of Hz or higher.

Recently however it has been proposed to detect temperature changes using Rayleigh based distributed fibre optic sensing. Temperature changes acting on the can result in optical path length changes in the sensing portions of the optical fibre for instance through physical length changes of the fibre and/or refractive index modulation. Rayleigh backscatter based distributed fibre optic sensing can thus be used to detect variations in temperature affecting the sensing portions of the sensing optical fibre. Such a Rayleigh based sensor responds rapidly to any temperature variations and thus provides a quicker indication of any temperature changes than conventional DTS systems. A Rayleigh based distributed fibre optic sensor also can indicate relatively small changes of temperature, of the order of 0.1° C. for example and thus may provide a greater precision for temperature changes than conventional DTS. Such Rayleigh based distributed fibre optic sensors can, however, only provide information about any changes in temperature and thus provide no information about what the absolute temperature is at a sensing portion.

SUMMARY OF THE INVENTION

Embodiments of the present invention are thus directed at methods and apparatus for fibre optic based temperature sensing that at least mitigate at least some of the disadvantages noted above.

Thus according to the present invention there is provided a temperature sensor for measuring temperature comprising:
 a fibre optic cable comprising an optical fibre;
 an interrogator unit configured to interrogate the optical fibre with electromagnetic radiation, detect any radiation that is Rayleigh backscattered within the optical fibre and determine a measurement signal indicative of temperature changes for at least one longitudinal sensing portion of the optical fibre;
 a controllable thermal element arranged along at least part of the length of the fibre optic cable and in thermal communication with the optical fibre;
 a controller configured to control said thermal element to generate a thermal variation; and
 an analyser configured to analyse the measurement signal from at least one sensing portion, extract a thermal response signal corresponding to the thermal variation and compare the thermal response to a predetermined characteristic to determine the temperature of the fibre optic cable at said longitudinal sensing portion.

The temperature sensor is based on distributed fibre optic sensing and provides a sensor for determining absolute temperature information using Rayleigh based distributed fibre optic sensing. Rayleigh based distributed fibre optic sensing is known for sensing dynamic changes affecting a sensing optical fibre and is well known for acoustic sensing. It has also been proposed for monitoring changes in temperature affecting an optical fibre, but conventional Rayleigh based sensing is not suitable for determining the actual temperature, i.e. the absolute temperature. The temperature sensor according to embodiments of the present invention includes a controllable thermal element, i.e. an element that can be used to introduce a controlled thermal stimulus, e.g. a heating or cooling. The controllable thermal element is controlled to apply a thermal variation to the fibre optic cable, i.e. to apply a thermal stimulus to the fibre optic cable. As will be described in more detail later the thermal response of the cable to such a stimulus is dependent on the absolute temperature of the cable and thus by monitoring the thermal response of the cable, as determined by Rayleigh based distributed fibre optic sensing, information about the temperature of the fibre optic cable can be determined.

The controllable thermal element may be located within the fibre optic cable.

In some embodiments the controller is configured to control the controllable thermal element such that said thermal variation occurs over a time period which is less than the thermal response time for heat transfer between the fibre optic cable and the surrounding environment. In some instances the thermal variation may be a repeating variation that is applied substantially continuously, at least over a period of time. The frequency of the thermal variation may be chosen such that the time period associated with each individual variation is shorter than a time period or time constant for heat transfer between the fibre optic cable and the surrounding environment.

The controller may be configured to control said controllable thermal element such that said thermal variation has a frequency that is greater than 0.1 Hz.

In some embodiments the controllable thermal element comprises a heating element for applying variation in heating power. The heating element may be an electrically conducting element and wherein the controller is configured to generate a time varying electric current in the electrically conducting element. The electrically conducting element may comprises an elongate conductor and/or a conductive wire. In some embodiments the electrically conducting element may at least partly surround the optical fibre. The temperature sensor may further comprise a second electrically conducting element arranged along at least part of the length of the fibre optic cable to provide a current return path. The electrically conducting element may be arranged such that its resistivity varies with temperature. The electrically conducting element and the optical fibre may be thermally coupled such that the thermal response signal corresponds principally to the thermal response of the electrically conducting element to the time varying current.

The temperature sensor may further comprising one or more buffer layers between the controllable thermal element and the optical fibre. The one or more buffer layers and the optical fibre may be thermally coupled such that the thermal response signal corresponds principally to the thermal response of the one or more buffer layers to the thermal variation. The thermal response of the one or more buffer layers may vary with temperature.

In some embodiments the predetermined characteristic is a predetermined relationship between amplitude of the thermal response signal and temperature.

The controller may be configured to operate periodically to generate said thermal variation. The interrogator unit may be configured to interrogate the optical fibre during periods in which no thermal variation is applied by said controllable thermal element to determine a measurement signal indicative of temperature changes for at least one longitudinal sensing portion of the optical fibre.

In some embodiments the interrogator unit is further configured to determine a measurement signal indicative of dynamic strains changes for at least one longitudinal sensing portion of the optical fibre.

Aspects also relate to a method of sensing temperature comprising:
  interrogating an optical fibre with electromagnetic radiation;
  generating a thermal variation in a controllable thermal element arranged along the length of the fibre optic cable and in thermal communication with the fibre optic cable;
  detecting any radiation that is Rayleigh backscattered within the optical fibre and determining a measurement signal indicative of temperature changes for at least one longitudinal sensing portion of the optical fibre;
  to the thermal variation and;
  comparing the thermal response to a predetermined characteristic to determine the temperature of the fibre optic cable at said longitudinal sensing portion.

The method may be implement in any of the variants described above.

In a further aspect there is provided a temperature sensor for measuring temperature comprising:
  a fibre optic cable comprising an optical fibre;
  an interrogator unit configured to interrogate the optical fibre with electromagnetic radiation, detect any radiation that is Rayleigh backscattered within the optical fibre and determine a measurement signal indicative of temperature changes for at least one longitudinal sensing portion of the optical fibre;
  an electrically conducting element arranged along the length of the fibre optic cable and in thermal communication with the fibre optic cable;
  a current controller configured to generate a time varying electric current in the electrically conducting element; and
  an analyser configured to analyse the measurement signal, extract a thermal response signal corresponding to the variation in electric current and compare the thermal response to a predetermined characteristic to determine the temperature of the fibre optic cable at said longitudinal sensing portion.

In a still further aspect there is provided a temperature sensor for measuring temperature comprising:
  an interrogator unit configured to interrogate an optical fibre of a fibre optic cable with electromagnetic radiation, detect any radiation that is Rayleigh backscattered within the optical fibre and determine a measurement signal indicative of temperature changes for at least one longitudinal sensing portion of the optical fibre;
  a current controller configured to generate a time varying electric current in an electrically conducting element that is arranged along the length of the fibre optic cable and in thermal communication with the fibre optic cable; and
  an analyser configured to analyse the measurement signal, extract a thermal response signal corresponding to the variation in electric current and compare the thermal response to a predetermined characteristic to determine the temperature of the fibre optic cable at said longitudinal sensing portion.

These aspects of the invention may also be implemented in any of the variants as described with respect to the first aspect.

DESCRIPTION OF THE DRAWINGS

Embodiments of the invention are now described by way of example only with reference to the accompanying figures, in which.

DESCRIPTION OF THE INVENTION

Embodiments of the present invention relate to the use of Rayleigh based distributed fibre optic sensing to provide distributed sensing of the absolute temperature of a sensing optical fibre. Embodiments use Rayleigh based distributed fibre optic sensing to detect temperature changes affecting a sensing optical fibre in a fibre optic cable whilst applying a thermal variation to the fibre optic cable. The thermal variation may for instance by a controlled variation in heating power of a heating element and in effect applies a thermal stimulus to the fibre optic cable. The thermal response of the fibre optic cable to the applied thermal stimulus is detected by the distributed fibre optic sensor. As will be explained in more detail below the thermal response of the fibre optic cable will depend, at least in part, on the actual temperature of the fibre optic cable. Thus, by determining the thermal response of the fibre optic cable to a controlled thermal variation, information about the absolute temperature of the fibre optic cable may be determined, for instance by comparing the detected thermal response to a predetermined characteristic.

Figure 1:
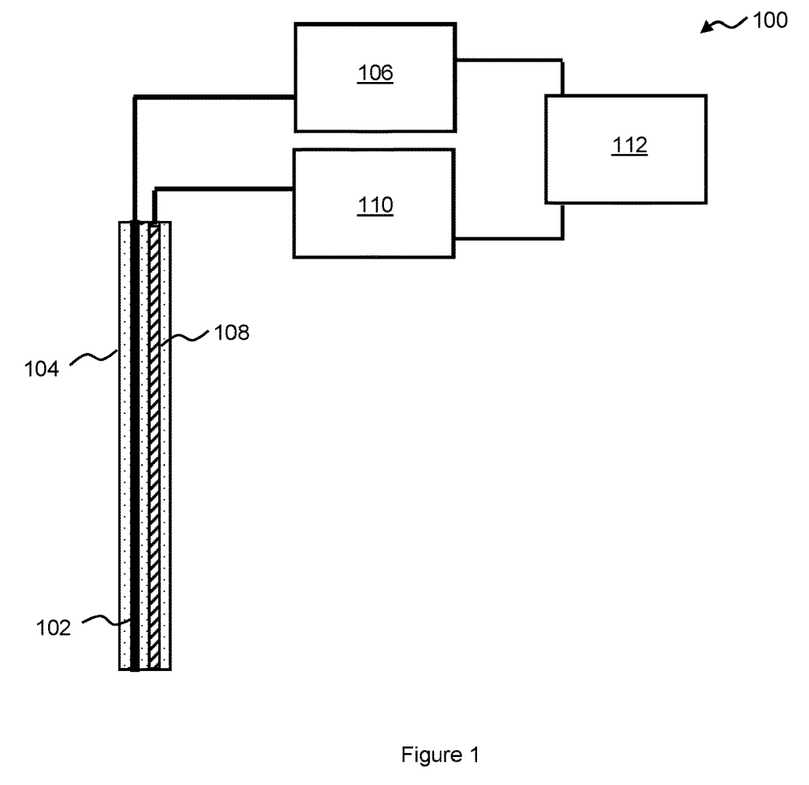
FIG. 1 shows an example apparatus according to an embodiment of the invention.

FIG. 1 shows a temperature sensor 100 according to an embodiment of the invention. A fibre optic cable 104 having an optical fibre 102 within the cable is deployed in an area of interest. An interrogator unit 106 is configured to interrogate the optical fibre with electromagnetic radiation, detect any radiation that is Rayleigh backscattered within the optical fibre and determine a measurement signal indicative of temperature changes for at least one longitudinal sensing portion of the optical fibre. A controllable thermal element, which in this case is an electrically conducting element 108, is arranged along the length of the fibre optic cable 104 so as to be in thermal communication with the fibre optic cable 104. Applying an electric current to the conducting element 108 will result in resistive heating of the conducting element 108. The conducting element 108 is thus a controllable heating element. A controller 110 is configured to control the controllable thermal element to generate a temperature variation, in this case by controlling the current applied to the conducting element to generate a time varying electric current in the electrically conducting element 108 and hence a variation in the amount of resistive heating. An analyser 112 is configured to analyse the measurement signal(s), extract a thermal response signal corresponding to the applied thermal variation, e.g. the variation in electric current, and compare the thermal response to a predetermined characteristic to determine the temperature of the fibre optic cable at said longitudinal sensing portion.

The interrogator unit 106 thus interrogates the optical fibre 102 of the fibre optic cable 104 to provide Rayleigh based distributed fibre optic sensing. The optical fibre 102 may be removably connected at one end to interrogator unit 106 using conventional fibre optic coupling means. In some embodiments the interrogator unit 106 is arranged to launch pulses of coherent optical radiation into the optical fibre 102 and to detect any radiation from said pulses which is backscattered within the optical fibre 102.

Figure 2:
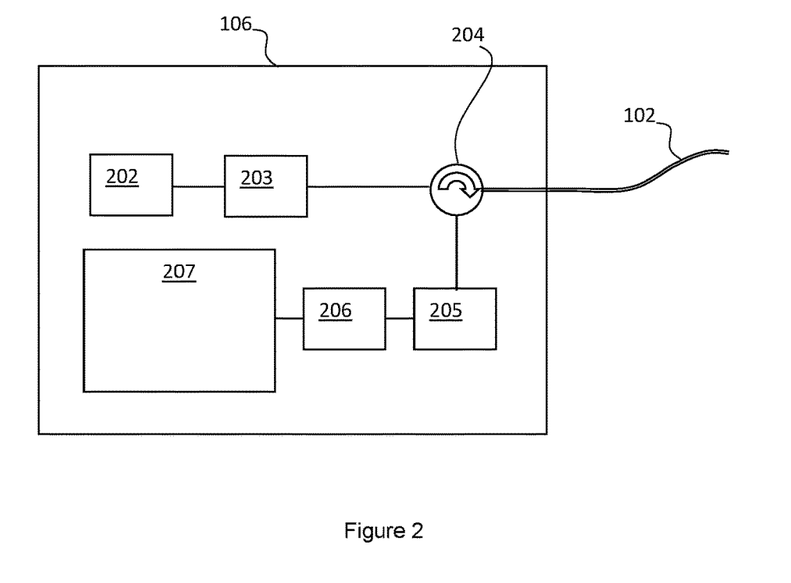
FIG. 2 shows an interrogator unit for Rayleigh based distributed fibre optic sensing.

FIG. 2 illustrates one example of an interrogator unit 106. As shown in FIG. 2, to generate the optical pulses, the interrogator unit 106 comprises at least one optical source 202, for instance a stable laser. The output of the laser 202 is received by a modulator 203 which generates the pulse configuration as will be described below. The pulses output from the modulator 203 are then transmitted into the optical fibre 102, for instance via a circulator 204. In some embodiments an alternative to using a modulator would be to drive the laser in such a way that it produces a pulsed output.

Note that as used herein the term "optical" is not restricted to radiation in the visible part of the electromagnetic spectrum and optical radiation as used herein includes infrared radiation, ultraviolet radiation and radiation in other regions of the electromagnetic spectrum that can be effectively transmitted and propagated in a fibre optic. The term "light" shall be construed similarly as having the same meaning as optical radiation.

Within the fibre the phenomenon of Rayleigh scattering results in some of the interrogating radiation being backscattered and propagating back towards the start of the optical fibre. In Rayleigh scattering, backscattering is caused by electromagnetic radiation elastically reflecting from scattering sites, e.g. inherent defects, within the optical fibre 102. In a simple model, the number of scattering sites can be thought to determine the amount of scattering that can occur. When the electromagnetic radiation reflects from the scattering points, it is not necessarily in phase with other backscattered radiation and this leads to an interference pattern in the backscattered signal. The form of the interference pattern is determined by the distribution of scattering sites through the fibre and the backscattering from a given longitudinal sensing portion is thus dependent on the distribution of scattering sites within that sensing portion. As noted previously whilst the backscatter from one independent sensing portion to the next may exhibit a random variation, the backscatter from any given sensing portion will, in absence of any environmental stimuli acting on the optical fibre, be the same from one interrogation to the next (provided the characteristics of the interrogating radiation are the same from one interrogation to the next).

Certain stimuli can change the effective optical path length within a section of fibre, such as a physical change in path length and/or a localised variation in refractive index. A physical path length change may occur due to expansion or contraction due to temperature changes or localised expansion and contraction due to passage of an acoustic wave through the optical fibre. Temperature variations may also result in a variation in refractive index and thus a change in effective path length. In this simple model, this can be thought of as changing the separation distance of the scattering sites but without any significant effect on the number of scattering sites. The result is a change in the interference characteristics. In effect, the stimulus leading to optical path length changes in the relevant section of fibre can be seen as varying the bias point of a virtual interferometer defined by the various scattering sites within that section of fibre 102.

Any radiation which is backscattered from the interrogating radiation propagating within the optical fibre 102 is directed to at least one photodetector 205, again for instance via the circulator 204. The detector output is sampled by an analogue to digital converter (ADC) 206 and the samples from the ADC 206 are passed to processing circuitry 207 for processing. The processing circuitry 207 processes the detector samples to determine an output value for each of a plurality of analysis bins, each analysis bin or channel corresponding to a different (albeit possibly overlapping) longitudinal sensing portion of interest of optical fibre 102. It will be noted that the interrogator unit 106 may comprise various other components such as amplifiers, attenuators, additional filters, noise compensators, etc. but such components have been omitted in FIG. 2 for clarity in explaining the general function of the interrogator unit 106.

Suitable patterns of interrogating electromagnetic radiation include, but are not limited to, pulses or pairs of pulses of coherent electromagnetic radiation, separated by a predetermined time interval.

In particular, in one embodiment the interrogating radiation may comprise a pair of pulses that are temporary separated, and thus spatially separated in the optical fibre. The modulator may be configured such that two pulses are of differing optical frequencies to one another. In such an embodiment the backscatter received at the detector comprises backscatter from both pulses, which will interfere, and thus there will be a signal component at the frequency difference between the pulses. As the two pulses are spatially separated in the fibre then an environmental disturbance acting on the fibre, between portions of the optical fibre where the pulses are scattered, can lead to an optical path length change between the scattering from each pulse. This in turn will produce a phase change in the signal at this difference frequency, which can be thought of as a signal at a carrier frequency. By an appropriate choice of carrier frequency and processing of the detected signal this phase change can be related to the amplitude of the disturbance acting on the fibre. Again the characteristics of the interrogating radiation, i.e. the frequencies and durations of the two pulses, would typically be the same for each interrogation. Such a Raleigh based distributed fibre optic sensor can provide an indication of the actual amount of phase shift caused by an incident stimulus and thus provide a quantitative measure of amplitude of any disturbance.

As described above, changes in temperature lead to changes in the path length between scattering sites which can be seen in the interference characteristics of the backscattered Rayleigh radiation.

Embodiments of the present invention apply a controlled thermal variation to the fibre optic cable, for instance by generating one or more thermal pulses in the fibre optic cable 104. In the example of FIG. 1, when a time varying current (such as a current pulse) is applied to electrically conducting element 108, this results in resistive heating in the electrically conducting element. As the electrically conducting element is thermally coupled to the fibre optic cable this results in time varying thermal pulses being generated in the fibre optic cable 104, which can cause temperature changes in the optical fibre 102.

The thermal pulses thus result in temperature changes in the sensing optical fibre and thus cause changes in the interference signal of any backscattered Rayleigh radiation, i.e. the measurement signal from a sensing portion of the distributed fibre optic sensor. This change in measurement signal due to the thermal pulses can be identified as a thermal response signal.

It has been appreciated that characteristics of the thermal response signal are dependent on the thermal properties of the materials surrounding the optical fibre in the fibre optic cable. It has been found that at least some of these thermal properties are dependent on the temperature of said materials and therefore an empirical relationship between characteristics of the thermal response (such as the amount of change in the measurement signal from a sensing portion) in the optical fibre and the temperature of the fibre optic cable can be derived. Furthermore, if the time scale over which the thermal variation is applied is relatively short, then the thermal response signal may be measured on a time scale over which there is no substantial heat transfer to and from the surrounding environment from the controlled thermal variation. In this way the applied thermal variation, e.g. a variation in heating power, can be used to determine the thermal response of the fibre optic cable itself, and hence probe the temperature of the fibre optic cable, substantially independently of external heat transfer. Thus, as will be described in more detail below, it has been appreciated that a measure of absolute temperature can be obtained using Rayleigh backscatter in a fibre optic cable to which a controlled thermal variation is applied, e.g. by an electrically conducting element.

The electrically conducting element 108 may be an elongate conductor that runs along substantially the entire length of the fibre optic cable, although in some embodiments the conductor may only be deployed for part of the fibre optic cable and/or there may be different elongate conductors arranged at different part of the fibre optic cable. The electrically conducting element may be incorporated into the structure of the fibre optic cable.

Figure 3:
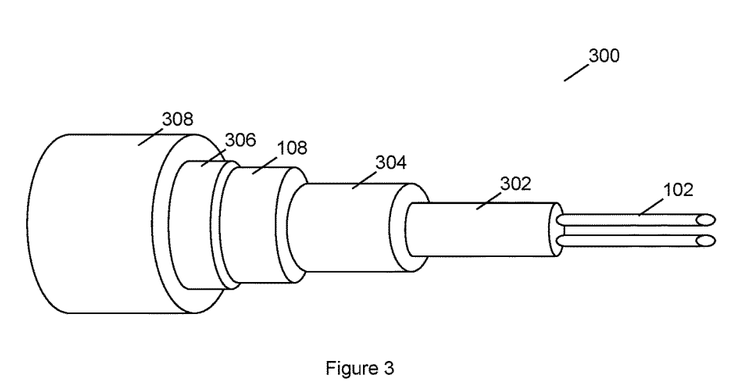
FIG. 3 shows a fibre optic cable suitable for incorporation into an apparatus according to an embodiment of the invention.
Figure 4:
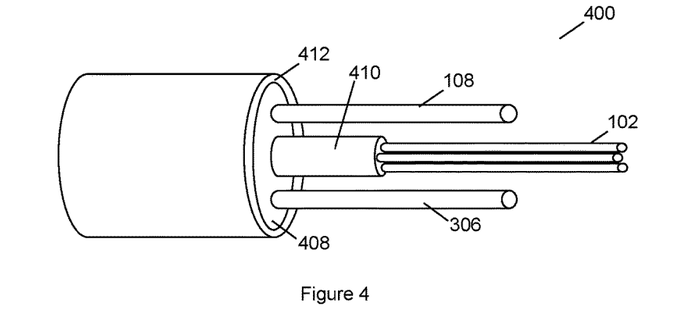
FIG. 4 shows an alternative fibre optic cable suitable for incorporation into an apparatus according to an embodiment of the invention.

There are many different possible structures of fibre optic cable 104, two examples of which are shown in FIGS. 3 and 4. FIG. 3 shows a cut-away illustration of a fibre optic cable 300 with a layered structure of concentric rings of material. Fibre optic cable 300 comprises one or more optical fibres 102. The optical fibre(s) may, as will be understood by one skilled in the art, comprise a core and cladding for providing an optical waveguide, possibly with one or more jacket layers. The optical fibre(s) may in some instances be encased in a compressible medium 302 where the compressible medium is arranged to some protection for the optical fibre(s) in the cable. The compressible medium may, in some instances, be encased within a buffer material 304 that may be surrounded by electrically conductive element 108 and a further conductive element 308 that provides an electrical return path. Electrically conductive element 108 and electrical return path 308 may be separated by a layer of electrically insulating material 306.

FIG. 4 shows an alternative fibre optic cable 400 comprising one or more optical fibres 102, an electrically conducting element 108 and return path 306 encased in a casing 412. The fibre optic cable may also comprise one or more buffer materials 408, 410.

As will be understood by the skilled person, the layouts shown in FIGS. 3 and 4 are just two examples and many modifications and substitutions are possible. In some examples, the layers may be in a different order to that shown in FIG. 3, and/or one or more layers may be omitted or substituted with different or additional layers. In particular, fibre optic cable 104, 300, 400 may comprise additional layers of insulation and/or compressible material. In some examples, fibre optic cable 104, 300, 400 may be armoured with one or more layers of reinforcing or strengthening material such as a metal guard layer. In some examples, said armouring may be formed from a conductive material such as a metal, e.g. steel, and may be used as electrically conducting element 108 or return path 306.

Various designs of fibre optic cables that include elements that can provide the electrically conducting element may be commercially available. For instance fibre optic cables of the type generally illustrated in FIG. 3 may be available with metallic sheathing layers provided as strengthening or armouring layers. As mentioned above such a metallic armour layer can be used to provide the electrically conducting element or the return path. Likewise cable structure may have metallic rod elements of the type illustrated in FIG. 4 to act as strengthening elements but which may be used in embodiments of the present invention as conductive, and thus heating, elements.

It will be appreciated that it would be possible to provide only a single conductive element within the cable structure with, for instance, a separate return path being provided and connected to the distal end of the fibre optic cable or a local ground at the distal end. Having both the conductive element and a return path within the cable structure does however provide convenience in deployment of the fibre optic cable and means that connections are only required at one end of the fibre optic cable (providing that an electrical connection between the conducting element 108 and the return path 306 is made at, what will become, the distal end of the cable before or during deployment).

As mentioned above in use the electrically conducting element 108 may be used as a heating element by causing a current to flow in the electrically conducting element. By applying controlled heating to the fibre optic cable various thermal properties of the cable may be determined.

In particular three properties of interest change with temperature, these are:
i) The temperature sensitivity of the optical fibre(s) 102;
ii) The heat capacity of the fibre optic cable 104, 300, 400 (changes the amount the cable heats up for a given heat input); and
iii) The resistivity of the electrically conducting element 108 (changes the power input per meter for a given current).

When the temperature of an optical fibre (and all the components mechanically coupled to it) changes, there is a resultant change in the optical path length within the fibre. This is caused by two main effects. First the refractive index of the fibre changes, and secondly the physical length changes. The refractive index change is an optical property of the fibre, and physical length of bare optical fibre changes only very slightly with temperature. However some of the materials that may be used in a fibre optic cable, such as steel armouring or a nylon tight buffered jacketing material for example, may exhibit a much more significant variation with temperature. Thus the sensitivity of the optical fibre to temperature change is dependent on the construction of the cable.

Tests have shown that bare optical fibre, e.g. a single mode unbuffered acrylate optical fibre, when interrogated by a DAS sensor that determines phase of a measurement signal, exhibits a detectable change of about 100 radians per metre per Kelvin whereas a cable including Ni wire and tight buffered nylon has a sensitivity of 473 rads/m/K.

It should be noted however that the stiffness and thermal expansion coefficients of nylon change with temperature, resulting in a change in the overall temperature sensitivity of the fibre. At a high temperature where the nylon is less stiff, the signal per unit temperature change reduces.

Essentially, for a given thermal input, the effect on the optical path length of a section the optical fibre 102 will depend on various thermal properties of the materials in the fibre optic cable (e.g. the layers of material separating the optical fibre from the electrically conducting element and indeed any jacket layers of the optical fibre itself). It has been found that the thermal properties of the fibre optic cable vary with absolute temperature such that, for a given heat input, the resultant effect on the sensing fibre various with temperature. Thus there is an empirical relationship between the absolute temperature of the fibre optic cable, the heat input into the fibre optic cable and a thermal response signal that can be derived from the measurement signal for a given sensing portion of the optical fibre.

In other words for any given sensing portion of the optical fibre, if a controlled thermal variation, e.g. a variation in heating, is applied to the fibre optic cable at the location of that sensing portion, then the amount of change in the measurement signal from that sensing portion will depend on the absolute temperature of the fibre optic cable at that location.

Embodiments of the present invention thus detect a thermal response signal in response, e.g. the amount of variation in phase detected by a given sensing portion, to a controlled thermal variation and compare the thermal response signal to a predetermined characteristic in order to determine the temperature of the fibre optic cable at that location.

In order to improve the detection of the thermal response signal, the thermal variation may be controlled in a time varying manner, e.g. a repeated variation in heating power may be applied. For instance the thermal variation may be applied as a series of thermal pulses at a particular repeat frequency. In some embodiments the current applied to the electrically conducting element 108 is a time varying current, e.g. an AC current at a particular AC frequency. The thermal response signal may therefore be seen as a variation in the measurement signal from a given sensing portion at the repeat frequency of the thermal pulses. The amplitude of this thermal response signal in response to a given thermal input may thus exhibit a relationship with the absolute temperature of the fibre optic cable at the location of the relevant sensing portion. It will of course be appreciated that an AC current that varies about zero will comprise two current pulses per cycle and thus the rate of thermal pulses introduced will be twice the AC frequency.

The relationship may be different for different fibre optic cable arrangement and may be determined in a characterisation or calibration process, for instance derived through experimentation on a particular type of fibre optic cable structure. Assuming a repeatable/consistent manufacturing process, once the relationship is known for a particular arrangement of materials in a fibre optic cable, it should be applicable to all cables made to that particular specification. Additionally or alternatively each fibre optic cable structure may be subject to a calibration process prior to deployment to determine the thermal response when at least part of the fibre optic cable is held at a series of known temperatures.

Conveniently the time varying thermal variation may be applied over a relatively short time scale compared to a time scale for heat exchange between the fibre optic cable and the environment (for temperature variations induced by the variable temperature element. The fibre optic cable will have a thermal response time or thermal time coefficient, $T_{cable}$ for heat exchange with its surrounding environment for any thermal input from the electrically conducting element. If a thermal pulse was introduced with a duration D greater than this thermal time response, i.e. D>$T_{cable}$, then at least some of the heat input from the pulse may be lost to the environment surrounding the fibre optic cable whilst the heating pulse is still being applied. The amount of heat lost would depend on the temperature gradient and thus the effect on the sensing fibre would depend partly on the heat transfer to the external environment. For a repeating thermal variation if the frequency of the thermal variation, e.g. time varying current, is too low, then the fibre optic cable may heat up or cool down due to external factors (e.g. heat loss to the surroundings, or gain due to an increase in external temperature) over the power cycle and this may influence the temperature measurement. Therefore, for a measure of the temperature of the fibre optical cable itself that is substantially independent of the environment on the outside of the fibre optic cable, the period of the time varying current should be less than the thermal response time, $T_{cable}$, for heat transfer between the fibre optic cable and the surrounding environment. In this way, over the course of a single period of oscillation, properties of the cable can be measured without being affected by heat transfer to and from the surroundings.

The response of the distributed fibre optic sensor to a thermal variation is thus measured over a period which is faster than the thermal time constant for heat exchange between the cable and its surrounding environment. Thus means that the detected response is purely due to the temperature change of the cable material itself. If the thermal variation applied is also applied within such a period the amount of heat supplied to the cable material in this period can also be known—allowing the detected response to provide information about the temperature of the cable itself. It will of course be appreciated that if a repeating variation is applied substantially continuously over a period the cable material itself may heat up and there will be heat exchange with the environment over the longer timescale. However the response to each individual thermal variation will depend just on the cable itself, e.g. the temperature and the thermal properties of the cable materials.

The sensitivity of the optical fibre to the controlled thermal variation will also depend on the structure of the fibre optic cable, i.e. the arrangement of the layers of material within the cable. In cables where there is little or no separation between the electrically conducting element 108 and the optical fibre 102, there will be high thermal coupling between the electrically conducting element and the optical fibre. This may result in the dominant component of thermal response signal being directly due to the temperature change of the electrically conducting element due to the time varying current. In such an example, the amplitude of the thermal response signal in the optical fibre depends principally on the thermal properties of the electrically conducting element, e.g. how resistivity changes with temperature. In such an embodiment it may be beneficial to choose a material for the electrically conductive element that has a relatively high variation of resistivity with temperature. For example, steel has a temperature coefficient of resistivity of 0.66% per degree Celsius at room temperature.

Using a constant (RMS) current supply, the electrical power dissipated will be proportional to the resistance. Examples of appropriate materials for the electrically conducing element include, but are not limited to, Steel, stainless steel, copper and Nickel.

In an alternative example, there may be one or more buffer layers 302, 304 between the optical fibre and the electrically conducting element 108. In this example, the optical fibre is thermally coupled to the controllable thermal element, i.e. the electrically conductive element, via the one or more buffer layers and the temperature change of the optical fibre in response to the applied thermal variation depends on how much heat is transmitted from the electrically conducting element through the buffer layer(s) to the optical fibre. The response of optical fibre to the thermal variation thus depends at least partly on the properties of the buffer material. For increased sensitivity, the thermal properties (i.e. thermal diffusivity) of the buffer material should be chosen to be relatively highly dependent on the temperature. Suitable buffer materials include, but are not limited to, nylon.

Figure 5:
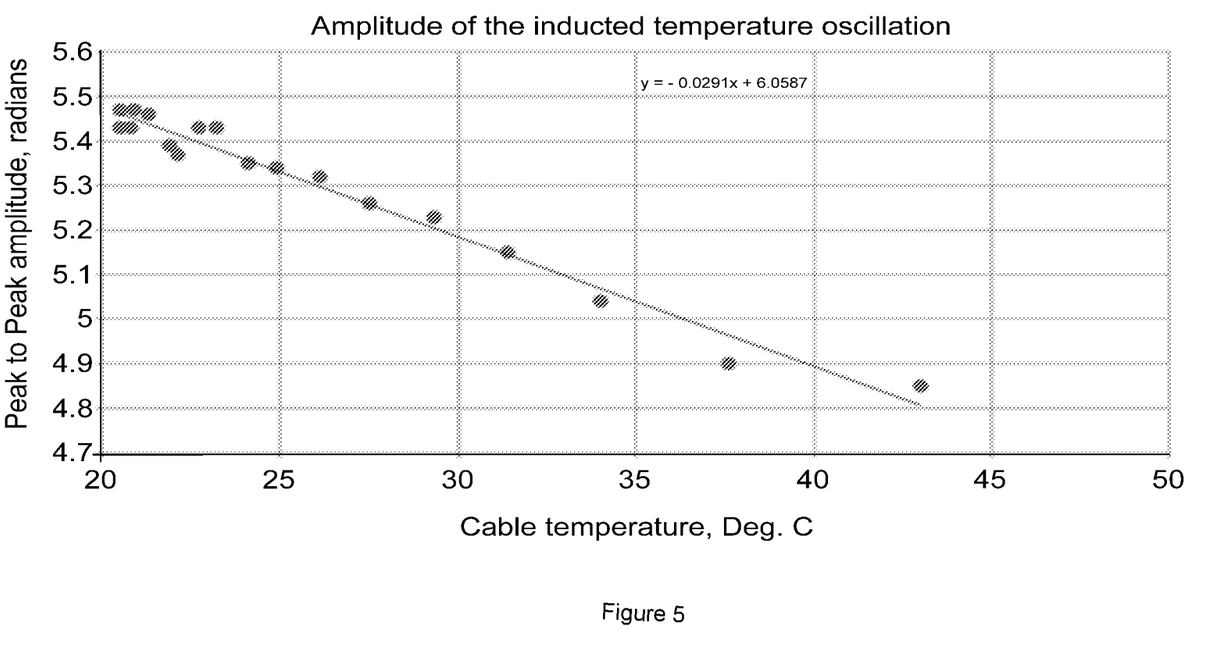
FIG. 5 is a graph of an experimental data set showing an empirical relationship between cable temperature and amplitude of the thermal response signal in the optical fibre.

An example dataset showing the amplitude of the thermal response signal at different temperatures for a fibre optic cable containing a nylon buffer layer between the electrically conducting element and the optical fibre is shown in FIG. 5. The data in FIG. 5 was acquired by applying an AC current at a given frequency, 0.5 Hz in this instance, to the electrically conducting element whilst performing Rayleigh based distributed fibre optic sensing on the optical fibre. The AC current was applied with a DC offset so the current varied from 0 to a maximum positive current throughout the cycle and thus there was a single thermal pulse per AC cycle. Each data point corresponds the detected variation in measurement signal from a sensing portion at the frequency of the applied thermal variation for different temperatures of the fibre optic cable. It can be seen that the amplitude of the thermal response signal, i.e. the variation in measurement signal induced by the controlled temperature variation, varies with the temperature of the cable, with the amplitude decreasing with increasing temperature. It can also be seen that in this case the response is fairly linear. By fitting a line through the data points, it can be seen that, in this case, the temperature, T, is given by $T=(6.0587-A)/0.0291$, where A is the amplitude of the thermal response signal in the Rayleigh backscatter in the optical fibre. These measurements were done at a current of 19 mA, although a higher current will induce a greater amount of resistive heating and give more sensitivity.

The tests were repeated with the fibre optical cable in different environments (water and air) and the results were the same in each case indicating the heat transfer to/from the external environment was not a factor at the frequency of the controlled thermal variation.

It should be noted that one of the advantages of the disclosed temperature sensor is that the low currents involved mean that the steel in a standard armoured fibre optic cable can be used as the electrically conducting element over cables of 40 km or more.

In some embodiments instead of a sinusoidal type current variation the current, and hence the heating power applied, was simply turned on and off, i.e. in a square wave modulation. In this case the detected measurement signals looks like a triangular wave as the cable heats/cools at an effectively constant rate. In such a case the rate of change of signal can be used as well as the amplitude to determine information about the temperature of the cable.

In arrangements where both the resistivity of the electrically conducting element and the thermal properties of the buffer layer(s) are dependent on temperature, the thermal signature measured by the optical fibre may be a combination of the thermal properties of the electrically conducting element and the buffer layer(s) between the electrically conducting element and the optical fibre. Thus, the composition and arrangement of the electrically conducting element 108 and any buffer layer(s) can be chosen to maximise the sensitivity of the temperature sensor.

Referring back to FIG. 1, analysis module 112 is configured to extract the thermal response of the optical fibre to the heat input by the electrically conducting element from the backscattered Rayleigh radiation and compute the amplitude of the thermal response signal. The analysis module 112 then uses an empirical relationship between the amplitude of the thermal response signal and the temperature, to determine the temperature of the fibre optic cable. As noted above, the precise form of the relationship will vary between different types of fibre optic cable and is obtained via calibration.

In some examples, the analysis module 112 calculates the temperature using measurement signals from a single power cycle of the time varying electric current.

Alternatively, analysis module 112 may combine two or more power cycles, for example by taking the mean or median of the measurement signals.

As mentioned above the electrically conducting element may be an elongate conductor that extends for a substantial part, and possibly all, of the length of the fibre optic cable. The current flowing through the conductor will be substantially the same along the length of the conductor and, for a continuous conductor diameter the resistive heating per unit length of conductor is likely to be constant along its length. Thus essentially the same controlled temperature variation can be applied simultaneously to a substantial length of the fibre optic cable and the measurement signals from a number of different sensing portions can thus be analysed to determine the thermal response at that section of the cable and hence the temperature of that part of the fibre optic cable. Embodiments thus provide a distributed fibre optic temperature sensor using Rayleigh based scatting.

The temperature sensor of embodiments of the invention may be used in a number of different ways. For example the controlled thermal variation could be applied periodically, e.g. at regular or irregular intervals. Thus an AC current could be applied for a short period to allow the thermal response to be determined, and hence the temperature of the fibre optic cable, and then the current could be discontinued. In periods when no current is being applied distributed fibre optic sensing may still be employed to detect changes in temperature. In which case the controlled thermal variation could be applied periodically or occasionally as a sort of calibration to confirm the temperature of the fibre optic cable, with temperature changes being monitored in the intervening periods using the known techniques for temperature change monitoring using Rayleigh based distributed fibre optic sensing. Additionally or alternatively, at least in the periods between the controlled thermal variation being applied, the distributed fibre optic sensor could be used for dynamic strain sensing, e.g. DAS sensing.

In some embodiments the controlled thermal variation (on a time scale shorter than thermal response time of the fibre optic cable) could be applied periodically to allow the absolute temperature of the fibre optic cable to be determined and at other times the variable temperature element could be controlled to apply a longer term thermal input.

If, for instance, a substantially DC current were applied to the electrically conducting element, or a current that only varied on the order of several tens of seconds say, then the thermal pulse(s) applied to the fibre optic cable would have sufficient time to interact with the surrounding environment. The amount of heating of the fibre optic cable will thus depend on the heat exchange between the fibre optic cable and the environment. By monitoring the thermal response on such a timescale information about the rate of heat exchange with the external environment can be determined, which may provide information about the environment, for example the flow rate of a fluid in which the fibre optic cable is immersed in (or otherwise in thermal contact with).

In some embodiments therefore the temperature sensor may be operable in two modes, with a first mode wherein a controlled thermal variation has a frequency with a period of oscillation less than the thermal response time for heat transfer between the fibre optic cable and the surrounding environment and second mode where a thermal input is applied for period longer than the thermal response time for heat transfer between the fibre optic cable and the surrounding environment. In this example, the absolute temperature may be measured during the first mode of operation and the heat transfer to the surrounding environment may be measured during the second mode. In some embodiments both measurements can be done at once by using two simultaneous AC frequencies (say 1 Hz and 0.01 Hz) and splitting up the signal with appropriate filters. In some embodiments the frequency could be varied according to a chirp.

In a further alternative example, the controlled thermal variation could be applied substantially constantly in use, e.g. a continuous alternating current (AC) could be applied with a period of oscillation less than the thermal response time for heat transfer between the fibre optic cable and the surrounding environment, so that the time scale of an individual thermal pulse is shorter than the thermal response time of the fibre optic cable. In this way a thermal response signal could be generated for at least one sensing portion that would indicate the ambient temperature of the fibre optic cable at the location of that sensing portion. Any changes in ambient temperature (over longer timescales) would result in a change in thermal response signal and thus the temperature can be tracked over time.

If such a time varying current were applied for a relatively long period (i.e. significantly longer than the thermal response time for heat transfer between the fibre optic cable and the surrounding environment) then it may be possible to determine not only the temperature of the fibre optic cable but also information about the heat exchange with the surrounding environment. The resulting measurement signal in the optical fibre will have a high frequency component with a low frequency envelope. The high frequency component will be dictated by the thermal response of the fibre optic cable to the heat pulses emitted by the electrically conducting element, as described above, and can be used to obtain the absolute temperature. The low frequency envelope function will reflect changes in temperature due to heat transfer between the fibre optic cable and the surroundings. Analysis module 112 may therefore be configured to extract both the low and high frequency components of the measurement signal, and determine the absolute temperature and/or properties of the heat exchange with the surrounding environment.

It will of course be appreciated that higher frequency vibrations or dynamic strains such as from incident acoustic signals would still also produce detectable vibrations and it would be possible to simultaneously use the distributed fibre optic sensor for dynamic strain sensing, e.g. as a DAS sensor, during a period when a measurement of absolute temperature of the fibre optic cable is being acquired.

Advantages of the disclosed temperature sensor are that Rayleigh scattering can be used to detect absolute temperature. This may provide an improvement in speed and cost-effectiveness over DTS systems that employ Raman or Brillouin scattering to measure temperature. Furthermore, the low currents involved may allow the invention to be employed using standard armoured fibre optic cables. The average absolute temperature can be combined with Rayleigh based fibre optic sensing for temperature changes to give a fast and accurate record of the temperature on each channel. Additionally or alternatively the absolute temperature monitored can be combined with strain sensing on the same optical fibre using a single interrogator unit. This allows both DAS type sensing and the equivalent functionality of conventional DTS type sensing but using a single interrogator unit.

The invention has been described with respect to various embodiments. Unless expressly stated otherwise, the various features described may be combined together and features from one embodiment may be employed in other embodiments.

Embodiments of the invention have been described with respect to generating thermal pulses in a fibre optic cable using resistive heating of a conducting element. Elongate conductive elements may be readily incorporated into a fibre optic cable structure and heating is provided simply by applying a current that can be relatively small. The principles however would apply to other methods of generating a controlled thermal pulse in a fibre optic cable, which could, in theory apply to applying cooling, e.g. through the thermoelectric effect or similar.

In some embodiments the cable may have a structure which is such that the thermal response of the cable varies with other environmental factors. For example a pressure sensitive cable could be provided where the density of the cable varies significantly with pressure, e.g. having cladding formed from a foam like material, thus changing the thermal time constant with pressure, as the heating wire moves closer to the fibre, or heat transfer rates.

It should be noted that the above-mentioned embodiments illustrate rather than limit the invention, and that those skilled in the art will be able to design many alternative embodiments without departing from the scope of the appended claims, The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A temperature sensor for measuring absolute temperature comprising:
    a fibre optic cable comprising an optical fibre;
    an interrogator unit configured to interrogate the optical fibre with coherent electromagnetic radiation, detect any radiation that is Rayleigh backscattered within the optical fibre and determine, for said Rayleigh backscattered radiation, a measurement signal for at least one longitudinal sensing portion of the optical fibre, wherein the measurement signal is indicative of any changes in optical path length of the relevant sensing portion;
    a controllable thermal element arranged along at least part of the length of the fibre optic cable and in thermal communication with the optical fibre;
    a controller configured to control said thermal element to generate a thermal variation; and
    an analyser configured to determine the absolute temperature of the fibre optic cable at at least one sensing portion from the measurement signal for the relevant sensing portion, wherein the analyser is configured to analyse the measurement signal from the relevant sensing portion, extract a thermal response signal corresponding to the extent of any change in optical path length over time of the relevant sensing portion in response to the thermal variation, and apply a predetermined characteristic of the fibre optic cable to determine, based on the thermal response signal, the absolute temperature of the fibre optic cable at said longitudinal sensing portion, wherein the predetermined characteristic is a predetermined relationship between the absolute temperature of the fibre-optic cable and an amplitude of variation of the thermal response signal over time in response to the thermal variation.

2. The temperature sensor of claim 1 wherein the controllable thermal element is located within the fibre optic cable.

3. The temperature sensor of claim 1 wherein the controller is configured to control said controllable thermal element such that said thermal variation has a frequency with a period less than the thermal response time for heat transfer between the fibre optic cable and the surrounding environment.

4. The temperature sensor of claim 1 wherein said controller is configured to control said controllable thermal element such that said thermal variation has a frequency that is greater than 0.1 Hz.

5. The temperature sensor of claim 1 wherein said controllable thermal element comprises a heating element for applying variation in heating power.

6. The temperature sensor of claim 5 wherein the heating element is an electrically conducting element and wherein the controller is configured to generate a time varying electric current in the electrically conducting element.

7. The temperature sensor of claim 6 wherein the electrically conducting element comprises an elongate conductor.

8. The temperature sensor of claim 6 wherein the electrically conducting element comprises a conductive wire.

9. The temperature sensor of claim 6 wherein the electrically conducting element at least partly surrounds said optical fibre.

10. The temperature sensor of claim 6 wherein the heating element further comprises a second electrically conducting element arranged along at least part of the length of the fibre optic cable to provide a current return path.

11. The temperature sensor of claim 6 wherein the resistivity of the electrically conducting element varies with temperature.

12. The temperature sensor of claim 6 wherein the electrically conducting element and the optical fibre are thermally coupled such that the thermal response signal corresponds principally to the thermal response of the electrically conducting element to the time varying current.

13. The temperature sensor of claim 1 further comprising one or more buffer layers between the controllable thermal element and the optical fibre wherein the one or more buffer layers and the optical fibre are thermally coupled such that the thermal response signal corresponds principally to the thermal response of the one or more buffer layers to the thermal variation.

14. The temperature sensor of claim 13 wherein the thermal response of the one or more buffer layers varies with temperature.

15. The temperature sensor of claim 1 wherein the predetermined characteristic of the fibre optic cable is a relationship between amplitude of the thermal response signal and absolute temperature of the fibre optic cable.

16. The temperature sensor of claim 1 wherein the controller is configured to operate periodically to generate said thermal variation.

17. The temperature sensor of claim 16 wherein the interrogator unit is configured to interrogate the optical fibre during periods in which no thermal variation is applied by said controllable thermal element to determine a measurement signal indicative of absolute temperature changes for at least one longitudinal sensing portion of the optical fibre.

18. The temperature sensor of claim 1 wherein the interrogator unit is further configured to determine a measurement signal indicative of dynamic strains changes for at least one longitudinal sensing portion of the optical fibre.

19. A coherent Rayleigh backscatter fibre optic sensor for measuring absolute temperature comprising:
   a fibre optic cable comprising an optical fibre;
   an interrogator unit configured to interrogate the optical fibre with coherent electromagnetic radiation, detect any radiation that is Rayleigh backscattered within the optical fibre and determine a measurement signal for at least one longitudinal sensing portion of the optical fibre, wherein the measurement signal is indicative of any changes in optical path length of the relevant sensing portion;
   an electrically conducting element arranged along the length of the fibre optic cable and in thermal communication with the fibre optic cable;
   a current controller configured to generate a time varying electric current in the electrically conducting element to generate a thermal stimulus; and
   an analyser configured to analyse the measurement signal to identify the magnitude of variation in the measurement signal over time in response to the thermal stimulus and determine the absolute temperature of the fibre optic cable at said longitudinal sensing portion based on the magnitude of variation in the measurement signal over time in response to the thermal stimulus and a predetermined characteristic of the fibre optic cable, wherein the predetermined characteristic is a predetermined relationship between the magnitude of variation in the measurement signal over time in response to the thermal stimulus and temperature.

20. A temperature sensor for measuring absolute temperature comprising:
   an interrogator unit configured to interrogate an optical fibre of a fibre optic cable with coherent electromagnetic radiation, detect any radiation that is Rayleigh backscattered within the optical fibre and determine a measurement signal indicative of any changes in optical path length for at least one longitudinal sensing portion of the optical fibre;
   a current controller configured to generate a time varying electric current in an electrically conducting element that is arranged along the length of the fibre optic cable and in thermal communication with the fibre optic cable; and
   an analyser configured to analyse the measurement signal, extract a thermal response signal corresponding to any changes in optical path length over time due to the variation in electric current, and apply a predetermined characteristic of the fibre optic cable to determine, based on the thermal response signal, the absolute temperature of the fibre optic cable at said longitudinal sensing portion, wherein the predetermined characteristic is a predetermined relationship between the absolute temperature of the fibre-optic cable and an amplitude of variation of the thermal response signal over time in response to the variation in electric current.

* * * * *